United States Patent Office 3,560,211
Patented Feb. 2, 1971

3,560,211

LIGHT SENSITIVE LEUCO DYE SYSTEMS CONTAINING NO MOLECULAR OXYGEN THEREIN

Richard A. Fotland, Lyndhurst, Ohio, assignor to Horizons Incorporated, a division of Horizons Research Incorporated

No Drawing. Filed Sept. 22, 1967, Ser. No. 669,678
Int. Cl. G03c *1/72, 5/24*
U.S. Cl. 96—48 14 Claims

ABSTRACT OF THE DISCLOSURE

Compositions consisting essentially of a mixture of (1) at least one leuco dye base and (2) an organic or inorganic iodide, chloride or bromide, preferably dispersed or dissolved in a synthetic polymer, e.g. as a film, exhibit sensitivity to high energy radiation, i.e., radiation having wavelengths shorter than 400 millimicrons.

Subjecting the composition (film) to an oxygen free atmosphere preferably under conditions such that molecular oxygen present in the composition is removed from the composition is found to markedly increase the sensitivity of the same, when the treatment is effected prior to or during exposure to the high energy radiation.

This invention relates to non-silver compositions which exhibit a high sensitivity to high energy radiation and to the processing of such compositions prior to or during exposure to high energy radiation in order to increase their sensitivity to said radiation.

More particularly, this invention relates to compositions which are a mixture comprising at least one colorless leuco compound admixed with one or more activator compounds, preferably dissolved or dispersed in a film forming polymer or otherwise supported as a radiation sensitive film, and to the treatment of such compositions in order to remove molecular oxygen from the composition and to the utilization of such compositions including exposure to patterns of suitable doses of high energy radiation and optical development and thermal fixing of the image produced by said exposure to radiation.

The compositions of the present invention are of special value in imaging radiation having wavelengths shorter than the wavelengths of visible light, i.e. wavelengths shorter than 400 millimicrons. Thus images may be formed in films containing the compositions of this invention as a consequence of exposure of such films to patterns of ultraviolet radiation, hard and soft X-rays, gamma rays, electrons, alpha particles and protons. The compositions of the present invention have numerous advantages over the commonly employed silver halide films including: (1) simplicity of processing, since the entire process requires no chemicals or liquids of any type; (2) lower cost of raw materials; and (3) capability for a high degree of versatility in sensitivity, image color, and the like.

The high energy sensitive compositions of the present invention include at least the following:

(1) at least one leuco compound whose salt forms a colored image; and
(2) at least one halogen-containing compound of the type hereinafter described.

These two constituents are supported on or dispersed or dissolved in a film forming polymer in the preferred embodiment of this invention.

In order to realize the highest sensitivity attainable with such compositions, the energy sensitive imaging material containing these constituents must be preconditioned either in a vacuum or in other oxygen-free environments for several seconds prior to exposure to the pattern of high energy radiation. While the exact mechanism by which this preconditionnig increases the sensitivity of the compositions is not known, it appears possible that this preconditioning is related to the removal of dissolved oxygen from the energy sensitive material.

After exposure to the pattern of high energy radiation, the resulting invisible or latent image formed in the energy sensitive material is optically developed as described in my copending U.S. patent application Ser. No. 553,414 filed May 24, 1966. With activators which are volatile at temperatures up to about 150° C., the energy sensitive material may be fixed by exposure to heat which drives the activator from the material. With activators which are not sufficiently volatile at these temperatures, the activator may be removed from the energy sensitive material by a simple solvent rinse in which the activator is soluble.

Having described the invention broadly the following description will set forth specific details of the composition and the manner in which it is used.

(1) THE LEUCO COMPOUNDS

Preferred leuco compounds in this group are represented by the following general formulas in which R represents a monovalent radical selected from the group consisting of H, alkyl and aryl, R′ represents a member selected from the group consisting of —OH or $—NH_2$; and Z represents a divalent member selected from the group consisting

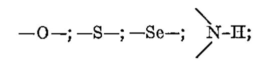

and

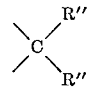

wherein R″ is either H or lower alkyl. The leuco compounds listed in Table II are representative of colorless image-forming materials suitable in the present invention. Table II is intended to illustrate the wide variety of compounds which may be employed and is not intended to limit the invention in any way.

As indicated above, one of the essential constituents in the energy sensitive compositions of the present invention is a dye-forming colorless compound, which may be a leuco base of a diaryl- or triarylmethane dye, or a leuco xanthene, leuco selenoxanthene, leuco thioxanthene, leuco acridine, leuco anthracene, and leuco anthraquinones.

TABLE I.—PREFERRED LEUCO COMPOUNDS

| Class | Structure |
|---|---|
| Leuco diphenylmethanes | 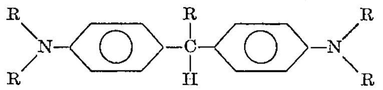 |
| Leuco triphenylmethanes | 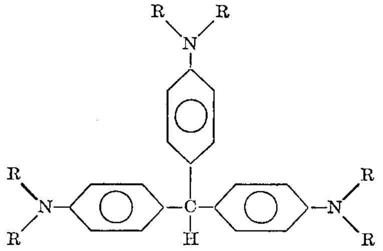 |
| Leuco zanthenes, Z is O<br>Leuco acridines, Z is NH<br>Leuco anthracenes, Z is CRR<br>Leuco selenozanthenes, Z is Se<br>Leuco thioxanthenes, Z is S | 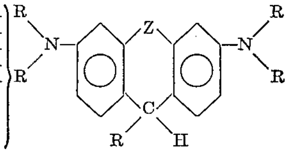 |
| Leuco anthraquinones | 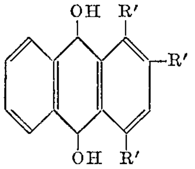 |

TABLE II.—EXAMPLES OF LEUCO COMPOUNDS

| Leuco Compound | Common Name |
|---|---|
| bis-(4,4′-dimethylaminophenyl)-aminomethane | Leuco auramine. |
| 4,4′-bis-dimethylaminodiphenylmethane | |
| 4,4′,4″ methylidenetris(N,N-dimethylaniline) | Leuco crystal violet. |
| p,p′ Benzylidenebis(N,N-dimethylaniline) | Leuco malachite green. |
| p,p′,p″ Triaminotriphenylmethane | Leuco pararosaniline. |
| p,p′,p″ Tridiphenylaminomethane | Leuco opal blue. |
| 2,7,-bis(dimethylamino)-9,10-dihydro-9,9-dimethylanthracene | |
| 3,6-bis(dimethylamino)-9-methylxanthene | |
| 3,6-tetramethyldiamino-10-selenoxanthene | |
| 3,6-tetramethyldiamino-10-thioxanthene | |
| 1,4-diamino-2,3-dihydroanthrahydroquinone | |
| 1,4-dihydroxyanthrahydroquinone | Leuco quinazarin. |

The second essential constituent in the compositions of the present invention is a halogen containing compound.

(2) THE ACTIVATORS

A wide variety of both organic and inorganic halogen compounds have been found to be useful as activators. For compositions amenable to thermal fixing, volatile organic compounds such as those in which three halogen atoms are attached to a terminal carbon atom, e.g. carbon tetrabromide, pentabromoethane, or iodoform, are suitable. In formulations in which it is desirable to have a high degree of absorption of incident energy, heavy metal halides such as the iodides or bromides of cadmium or lead have been found to be useful. Mixtures of activators from either or both of these groups have also been utilized successfully in the high energy imaging compositions of the present invention.

Organic halides:
- Carbon tetrabromide
- Bromoform
- Iodoform
- Hexachloroethane
- Hexabromoethane
- Pentabromoethane
- 1,1,2,2-tetrabromoethane
- α,α,α-tribromoacetophenone Inorganic halides:
- Lead bromide
- Cadmium bromide
- Lead iodide
- Cadmium iodide

(3) FILM-FORMING POLYMER

The leuco compound and activator are preferably dissolved or dispersed in a film-forming polymer. The imaging media may then be formed by dissolving the polymer and casting a solution containing the polymer, the leuco compound and the activator onto a support to form a thin film or, where it is desirable to obtain high absorption or three-dimensional imaging, the solution may be cast into rods, discs, blocks, or other shapes. Preferred polymers for this invention are polystyrene and polycarbonate, but other film forming materials, such as polyvinyl chloride, polyvinyl acetate, ethylcellulose, cellulose acetate and co-polymers of such polymers, may be employed. Illustrative film forming binders are listed in Table II of U.S. Pat. No. 3,275,443 and others will be readily apparent to those skilled in the art.

(4) ANTIFOGGANTS

In order to diminish the rate of thermal image formation over long periods of time such as might be encountered during storage of the film, and in order to minimize thermal fogging during optical development when this step is carried out at high temperatures and during thermal fixing, various compounds may be added to the compositions of this invention. Suitable antifoggants include triphenylstibine, triphenylarsine, m-dimethylaminophenol and 2,6-di-tert-butyl-p-cresol, and in general tertiary phenols and triaryl derivatives of any of phosphorus, antimony, arsenic and bismuth and mixtures of tertiary phenols and triaryl metal derivatives, may be utilized. Any of the antifogging agents described in Wainer U.S. Pat. 3,275,443 may be used in the present invention.

(5) HIGH ENERGY ABSORBING MATERIALS

In many applications of high energy imaging, it is desirable to maintain a high film speed together with high resolving power. The high speed implies a high absorption for the incident high energy radiation while the high resolution requires that the film thickness be as low as consistent to provide significant absorption of the incident high energy beam. Thus in X-ray imaging, particularly in the region of middle to high X-ray energies, it is desirable to employ a thin film containing as high a percentage of large atomic number atoms as is possible. It has been found that photochemically inert high atomic number elements may be incorporated into X-ray imaging films in order to increase the X-ray absorption and thus the film speed. The function of the absorber material, in the case of films formulated for X-ray sensitivity, is to provide absorption of the X-ray beam with a subsequent generation of high energy photoelectrons. The photoelectrons are then absorbed by the activator, causing a chemical reaction which forms the latent image. Materials for high energy absorption contain the elements mercury, lead, bismuth, barium or tungsten. In order to realize the highest possible absorption, lead is a preferable element in this application. Organo-lead compounds, such as triphenylmethyl lead, trimethyl lead bromide, or trimethyl lead iodide, may be dissolved in the film or inorganic lead compounds, such as lead carbonate, lead iodide, lead oxide, or lead tungstate may be dispersed in the film in the form of a fine powder.

(6) PROPORTIONS

The relative proportions of the several constituents in the radiation sensitive compositions of this invention may be varied over a considerable range without deleteriously affecting the suitability of the products for the indicated uses; suitable proportions are indicated in the following table.

| Constituent | Parts by weight per part of polymer | Optimum |
|---|---|---|
| (1) Leuco compound | 0.01–1 | 0.2 |
| (2) Activator, Organic halide; Inorganic halide | 0.01–1 | 0.2 |
| (3) Antifoggant [1] | 0.0001–1 | (2) |
| (4) High energy absorbing material | 0.01–1 | 0.5 |

[1] When present.
[2] Depends upon type.

(7) FILM PREPARATION AND PROCESSING

In order to realize the highest sensitivity, it is necessary to treat high energy imaging films and cast structures in an oxygen-free environment for a short period of time prior to exposure. In preferred binders, such as polystyrene or polycarbonate, it has been found that the treatment time is approximately 2 seconds per micron of thickness. Thus, a 25 micron (1 mil) thick film requires a treatment time of 50 seconds. This treatment may be carried out by maintaining the film in an inert gas or nitrogen atmosphere. Alternately, the film may be placed within a vacuum chamber or on a vacuum printing frame where the surface pressure is below 1 torr. It is probable that this treatment serves to remove dissolved molecular oxygen from the polymer film, or to remove any oxygen which may be adsorbed on the surface of the energy sensitive film. After treatment, the film must not be exposed to oxygen until after exposure has taken place. For certain applications, e.g. as described in my U.S. Pat. 3,341,728 issued Sept. 12, 1967, which describes a process in which energy sensitive film is maintained in a vacuum for a short period of time prior to exposure and then exposed to an electron beam while in a vacuum, such treatment is not necessary as a separate operation. The speed increase which results as a consequence of this treatment has generally been found to lie between a factor of 10 and 100.

As previously indicated, the high energy imaging film and structures of this invention may be optically developed by subjecting such films or structures to a blanket irradiation of red or near-infrared illumination, e.g., as described in my copending U.S. Pat. application Ser. No. 552,414. A preferred method of obtaining such blanket irradiation employs a high efficiency tungsten-iodine lamp whose radiation is filtered with a red glass filter having a sharp cutoff in the region of 610 to 660 millimicrons.

The following examples will illustrate compositions and procedures which have been found to be effective in the practice of this invention.

EXAMPLE 1

The following ingredients were dissolved in 28 cc. of a 20% solution of polystyrene (molecular wt. 230,000) in benzene by adding them to the solution of polymer in the order listed:

0.6 gram leuco crystal violet
0.5 gram triphenylstibine
0.8 gram hexachloroethane
0.8 gram carbon tetrabromide
0.1 cc. 1% solution of m-dimethylaminophenol in methylene chloride.

The resulting composition was deposited as a thin coating by means of a Bird applicator. The coating had a wet thickness of 1.5 mils and was deposited on a sheet of polyester (500D Mylar). The coating was permitted to dry in air. A dry coating thickness of 6 microns was obtained. Preparation of the composition and of the film were carried out under red safelight conditions.

Film samples were placed in an electron beam sensitometer which was evacuated to a pressure of $10^{-6}$ torr. The film was exposed to an electron beam accelerated through a potential of 15 kv. After processing, a blue image was observed in the electron-struck areas. An image density, measured using a Kodak Wratten No. 93 green filter, of 1.0 was observed at electron exposures of $10^9$ electrons/cm.$^2$. A maximum density of 1.6 was obtained at an exposure of $1.5\times10^9$ electrons/cm.$^2$.

Other film strips were exposed to X-rays generated by a Westinghouse medical X-ray apparatus. The tube potential was 90 kvp. and 1.25 mm. aluminum filtration was employed to eliminate extremely soft radiation. A tube-to-film distance of 50 cm. was employed. Some films were maintained in a plastic bag which was continuously purged with nitrogen for a period of 15 seconds prior to and also during the exposure. Other films were placed face down on a vacuum frame and the sensitive coating was maintained under vacuum for 15 seconds prior to and during exposure. Exposures of 13 milliampere-seconds resulted in the formation of image densities, after processing, of 1.0 above base plug fog, the fog level being 0.3 density units. A maximum density of 2.5 was obtained at exposure levels near 25 ma.-s. By placing the sensitive coating in intimate contact with a lead foil, the sensitivity of the film was essentially doubled. The lead foil in this case serves as a source of X-ray generated photoelectrons which expose the film. A speed comparison was made using Kodak no-screen medical X-ray film. Under the same exposing conditions, an exposure of 1.4 ma.-s. was required to realize, after processing, a density of 1.0 above base plus fog.

Optically developed film manufactured as described above, except that it was not maintained in a non-oxygen environment prior to and during exposure, exhibited a speed reduced by a factor of 50, as compared with film which had been placed in the oxygen-free atmosphere prior to exposure.

After exposure, the latent image was optically developed by subjecting the film to blanket irradiation from two 1500 watt tungsten-iodine Quartzline (G.E.) lamps; the radiation being filtered by a Corning No. 2408 red glass filter having a sharp cutoff at 610 millimicrons. A water-cooled glass chamber was also inserted in the radiation path to remove infrared radiation from the developing radiation in order to prevent film overheating during development. The lamp-to-film distance was 10 centimeters and the maximum development time (limited by fog buildup in non-image areas) was 5 minutes. The films were fixed by heating in an oven, at a temperature of 140° C., for 1 minute.

EXAMPLE 2

A film was prepared as in Example 1, but with the following coating composition:

70 cc. 10% polycarbonate resin in dichloromethane
0.5 cc. 1% m-dimethylaminophenol
1.5 gm. leuco malachite green
3.5 gm. triphenylstibine
2.0 gm. hexachloroethane
2.0 gm. lead bromide dissolved in N,N-dimethylformamide.

Exposure of this film to an oxygen-free atmosphere prior to and during exposure was found to increase the sensitivity of the film by a factor of at least 50 as compared with the sensitivity of film not so treated.

Under the exposure and processing conditions described in Example 1, an electron exposure of $10^{10}$ electrons/cm.$^2$ or 45 ma.-s., an X-ray exposure of 45 milliampere seconds, was required to obtain a net optical density of unity in the exposed areas of the film.

EXAMPLE 3

Example 1 was repeated substituting a coating solution containing the following:

0.6 gm. leuco auramine
0.2 gm. triphenylstibine
1.2 gm. pentabromoethane
30 cc. of a 20% solution of polystyrene in benzene in place of the coating solution of Example 1.

The resulting films possessed X-ray and electron beam sensitivities in the range exhibited by the films of Example 1. The image color is yellow to yellow-orange and the optical development time ranged up to 9 minutes.

EXAMPLE 4

Example 1 was repeated using the following coating solution in place of the coating solution of Example 1:

0.6 gm. leuco opal blue
0.2 gm. triphenylstibine
1.2 gm. pentabromoethane
30 cc. of a 20% solution of polystyrene in benzene.

The resulting films possessed X-ray and electron beam sensitivities in the range exhibited by the films of Example 1.

EXAMPLE 5

The procedure of Example 2 was repeated, except that 1.5 grams of 2,7-bis(dimethylamino)-9,10-dihydro-9,9-dimethyl-anthracene were used in place of the leuco malachite green. Films with similar properties were obtained.

EXAMPLE 6

Example 5 was repeated using leuco quinazarin instead of leuco malachite green. The resulting films were similar in properties.

Having now described my invention in accordance with the patent statutes, I claim:

1. A non-silver photosensitive material for imaging high energy radiation, said composition comprising:

(a) at least one colorless leuco compound whose salt is colored;

(b) at least one halogen containing compound represented by the following formulas:

$$A—C—X_3 \text{ and } QX'_n$$

wherein A represents a monovalent radical selected from the group consisting of H, Cl, Br, I, alkyl, haloalkyl, aryl and aroyl; each X is a halogen selected from the group Cl, Br and I; Q represents a heavy metal atom, such as lead or cadmium; and X' is a halogen selected from the group consisting of Br and I and $n$ is a small integer; and (c) a film forming polymer in which said constituents (a) and (b) are dispersed or dissolved;

said composition being characterized by the absence of the molecular oxygen normally present therein.

2. The composition of claim 1 wherein the leuco compound is a colorless leuco triphenyl methane or leuco diphenylmethane compound.

3. The composition of claim 1 wherein the leuco compound is selected from the group consisting of leuco xanthenes, leuco selenoxanthenes, leuco thioxanthenes, leucoacridines and leuco anthracenes.

4. The composition of claim 1 in which the halogen containing compound represented by the formula $$A—C—X_3$$

is a halogen substituted lower alkane.

5. The composition of claim 1 wherein for each part by weight of polymer the composition includes between 0.01–1 part by weight leuco compound and between 0.01 and 1 part by weight of activator.

6. Te composition of claim 1 including in addition an antifogging compound.

7. The composition of claim 1 including, in addition, at least one material to increase the absorption of high energy radiation by said composition selected from the group consisting of compounds of at least one element selected from the group consisting of mercury, lead, bismuth, barium and tungsten.

8. The composition of claim 7 wherein the additional material is an "organo lead compound."

9. The composition of claim 1 as a thin film.

10. A process for increasing the sensitivity of a non-silver photosensitive material to high energy radiation which process includes:

preparation of an article consisting of the material according to claim 1; and subjecting said material to an atmosphere having a sufficiently low partial pressure of oxygen to effect removal of substantially all of molecular oxygen from said article and to transfer said oxygen into said atmosphere.

11. The process of claim 10 and thereafter photographically exposing said composition.

12. The process of claim 10 wherein said atmosphere is a vacuum.

13. The process of claim 10 wherein said atmosphere is nitrogen.

14. The process of claim 11 and thereafter developing the image by a blanket exposure of said material to visible radiation.

References Cited

UNITED STATES PATENTS

| | | | |
|---|---|---|---|
| 3,042,518 | 7/1962 | Wainer | 96—48 |
| 3,147,117 | 9/1964 | Wainer et al. | 96—48 |
| 3,275,443 | 9/1966 | Wainer | 96—90 |

NORMAN G. TORCHIN, Primary Examiner

R. E. FICHTER, Assistant Examiner

U.S. Cl. X.R.

96—90